(No Model.)

T. H. BOWLES.
TRAVELING SIGN FOR STREET CARS.

No. 288,615. Patented Nov. 20, 1883.

Attest:
Walter Macdson
F. L. Middleton

Inventor
Thomas H. Bowles
by Ellis Spear
Atty.

UNITED STATES PATENT OFFICE.

THOMAS H. BOWLES, OF ATLANTA, GEORGIA.

TRAVELING SIGN FOR STREET-CARS.

SPECIFICATION forming part of Letters Patent No. 288,615, dated November 20, 1883.

Application filed December 6, 1882. (No model.)

*To all whom it may concern:*

Be it known that I, THOMAS H. BOWLES, of Atlanta, in the county of Fulton and State of Georgia, have invented a new and useful Improvement in Traveling Signs for Street-Cars, &c.; and I do hereby declare that the following is a full, clear, and exact description of the same.

My invention relates to advertising, and more particularly to the construction of a traveling endless sign intended more particularly for street-cars, but adapted to railway-cars, steamboats, and to other localities where driven machinery can be utilized for motive power; and the invention consists in the details of construction and their novel arrangement, all of which is fully hereinafter explained.

I have illustrated one mode of carrying out my invention in the accompanying drawings, in which—

Figure 1:
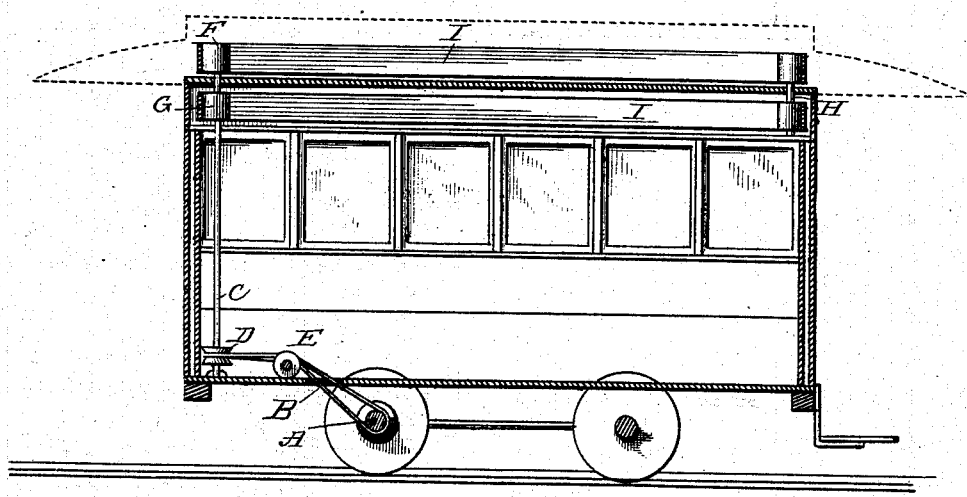
Figure 2:
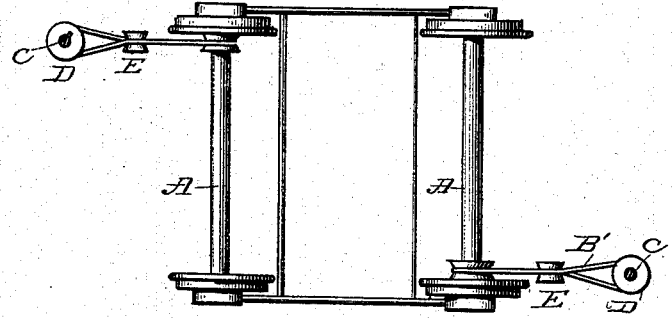

Figure 1 represents a central longitudinal vertical section of a car with my device attached. Fig. 2 is a top view of gearing, showing construction of vertical shaft as driven by car-axle, with belt passing over two guide-pulleys.

Around the axle A of the cars is a belt, B B, which is connected to the vertical shaft by pulley D, placed at one end of the car. The belt B B passes over two guide-pulleys, E E, a narrow opening being made in the floor of the car to admit such belt. The pulley D is mounted or keyed on a vertical shaft, C, stepped in a socket in the floor of the car. This shaft extends up the entire height of the car, passing through the roof. Mounted firmly upon this shaft are pulleys F G, one being placed above and one below the roof. At the opposite end of the car is a short vertical shaft, H, which has pulleys similar to F G upon it. Over these pulleys is stretched an endless band, of canvas or leather, I I, adapted to receive or form a support for various advertising devices. If motion is imparted to the pulleys, the belts will move in unison, one on top of the car in view of those outside, and one inside the car in view of the passengers.

If so desired, the sign for the inside of car can be made to show on the outside also by placing the shafts C H in the center of the wall of side of car, thus allowing the same belt or canvas to pass in view on the outside.

It will be understood that the counterpart of the apparatus just described is arranged upon the opposite side of the car, driven in the same manner from the axle on the other end of the car.

When properly arranged, my traveling sign would fill the space now generally occupied by advertising-panels.

I do not confine myself to the described gearing, for other means of connecting the axle to the vertical shafts might be employed, such as chain, eccentric ratchet, cog, and friction gearing.

I am aware that station-indicators have been operated from the axle of a car, and disclaim the broad idea of causing an indicating device to assume different positions within a car by mechanism connecting it with the axle.

Having thus described my invention, I claim—

Combined with the vertical shafts operated by the axle of a car, the pulleys F G, situated, respectively, within and without the car, and the endless advertising-belts.

In testimony whereof I have signed my name to this specification in the presence of two subscribing witnesses.

THOMAS H. BOWLES.

Witnesses:
W. M. SCOTT,
E. W. CALLAWAY.